US008897709B2

(12) United States Patent
Valentine

(10) Patent No.: US 8,897,709 B2
(45) Date of Patent: Nov. 25, 2014

(54) SYSTEMS AND METHODS FOR ENABLING NON-COGNITIVE RADIO DEVICES TO FUNCTION AS COGNITIVE RADIOS

(75) Inventor: Eric Lee Valentine, Plano, TX (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 589 days.

(21) Appl. No.: 12/876,191

(22) Filed: Sep. 6, 2010

(65) Prior Publication Data

US 2012/0058794 A1   Mar. 8, 2012

(51) Int. Cl.
| H04B 15/00 | (2006.01) |
| H04W 48/10 | (2009.01) |
| H04W 24/00 | (2009.01) |
| H04W 28/04 | (2009.01) |
| H04W 48/08 | (2009.01) |
| H04W 48/16 | (2009.01) |
| H04W 72/00 | (2009.01) |
| H04W 72/02 | (2009.01) |

(52) U.S. Cl.
CPC ............ *H04W 48/10* (2013.01); *H04W 24/00* (2013.01); *H04W 28/04* (2013.01); *H04W 48/08* (2013.01); *H04W 48/16* (2013.01); *H04W 72/00* (2013.01); *H04W 72/02* (2013.01)
USPC .............................. 455/62; 455/509; 455/513

(58) Field of Classification Search
CPC ...... H04W 28/04; H04W 72/00; H04W 72/02
USPC ........................................................... 455/62
See application file for complete search history.

(56) References Cited

U.S. PATENT DOCUMENTS

| 5,963,848 | A | * | 10/1999 | D'Avello .......................... 455/62 |
| 2008/0076450 | A1 | | 3/2008 | Nanda et al. |
| 2009/0215457 | A1 | * | 8/2009 | Wang et al. ................. 455/435.1 |
| 2010/0069013 | A1 | | 3/2010 | Chaudri et al. |
| 2010/0195590 | A1 | | 8/2010 | Park |
| 2010/0238868 | A1 | | 9/2010 | Melpignano et al. |
| 2012/0142386 | A1 | * | 6/2012 | Mody et al. .................... 455/509 |

OTHER PUBLICATIONS

Hoven, N., et al., "Some Fundamental Limits on Cognitive Radio," Wireless Foundations, EECS, University of California at Berkeley, Feb. 11, 2005, http://www.eecs.berkeley.edu/wireless/posters/WFW05_cognitive.pdf, pp. 1-16.
"Cognitive Radio". Retrieved from the internet: http://en.wikipedia.org/w/index.php?title=cognitive_radio&oldid=333116881.

* cited by examiner

*Primary Examiner* — David Bilodeau

(57) ABSTRACT

Systems and methods according to the exemplary embodiments enable non-cognitive radio devices to operate as if they were cognitive radio devices. A pilot radio device analyzes a local radio environment and broadcasts a spectrum map message which indicates, for example, available radio resources in the local radio environment. A non-cognitive radio device receives the spectrum map message and uses the information in the spectrum map message to select a radio resource for its own transmissions and/or receptions.

16 Claims, 9 Drawing Sheets

SYSTEMS AND METHODS FOR ENABLING NON-COGNITIVE RADIO DEVICES TO FUNCTION AS COGNITIVE RADIOS

TECHNICAL FIELD

The present invention relates generally to communications systems and in particular to methods, devices and systems associated with cognitive radio.

BACKGROUND

As technology advances, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and Wi-Fi have added a mobile element to communications.

Until relatively recently, the primary use of cellular communications has been for voice communications between people. Even for this usage case, considerable optimization has been performed to carry the comparatively small amount of traffic in an optimal way, for instance the introduction of lower bit-rate codecs. In the last few years, the amount of information that needs to be transmitted has begun to increase dramatically with the increasing ubiquity of smart phones, wireless data services and users communicating with machines, particularly servers on the Internet. The next trend will likely be for mobile devices to be used to support machines communicating with other machines (e.g. "M2M"), for instance for remote monitoring and control and many other applications.

For these reasons, it is projected that, in the near future, there will be on the order of fifty billion connected communication devices. Of those, wireless devices are expected to interact with one another over a variety of air interfaces e.g., 3GPP-based radio interfaces, Bluetooth, Zigbee, etc, which may also use different bandwidths in the various frequency spectrums which have been allocated for wireless communications. With this growth in wireless communications, it is not surprising that almost all usable frequency bands have been allocated. Since radio spectrum has absolute limits in terms of usable frequencies, and the uses for radio communication continue to increase, there is a constant search for means to optimize the use of radio resources. One such approach is cognitive radio.

While there are several variants of cognitive radio, one way to describe this technology is that cognitive radio allows a device to sense the radio environment in which it is operating and then to use that information, and various input parameters (such as user behavior), to select a portion of the frequency spectrum to use for its communications, e.g., a portion of the spectrum that is both legitimate (e.g., in view of local or regional spectrum allocation rules) and that does not result in too much interference relative to other ongoing communications. This enables cognitive radio devices to use spectrum which, while nominally allocated for some purpose, is not currently being used in a particular location.

The research and development in cognitive radio technology is thus driven by, for example, (1) the recognition that radio resources are scarce and expensive and (2) a significant portion of the spectrum is relatively unused, but is "reserved" (like ham radio frequencies). Some challenges associated with the possibility of implementing cognitive radio systems include that: (1) the use of spectrum by primary users should be protected, (2) there may be legacy systems already in place that cannot be modified, (3) the usage of the spectrum in a particular area by primary users may vary as a factor of time, (4) as there may be multiple secondary users, the use of the spectrum between secondary users should be coordinated, (5) the available unused bandwidth may be discontinuous so that, for example, a user that needs 10 MHz of spectrum may need to "assemble" smaller chunks of spectrum instead of one continuous piece, (6) variations in the local radio environment, such as shadowing, can make it difficult for a secondary user radio to determine its radio situation relative to that of the primary user, e.g. "close but shadowed" versus "not-shadowed but far away", and (7) noise uncertainty can make signal detection difficult and, below certain limits, effectively impossible.

Despite these, and other, challenges associated with implementing cognitive radio, the need to enable greater spectrum re-use is expected to drive further market-driven research in this area.

SUMMARY

Systems and methods according to the exemplary embodiments enable non-cognitive radio devices to operate as if they were cognitive radio devices. A pilot radio device analyzes a local radio environment and broadcasts a spectrum map message which indicates, for example, available radio resources in the local radio environment. A non-cognitive radio device receives the spectrum map message and uses the information in the spectrum map message to select a radio resource for its own transmissions and/or receptions.

According to one exemplary embodiment a method for generating and transmitting radio environment information to enable non-cognitive radio devices to operate as cognitive radios, includes the steps of: receiving, by a pilot radio device, a broadband radio sample associated with a radio environment, analyzing, by the pilot radio device, the broadband radio sample to identify channels in the radio environment which are available for use, generating, by the pilot radio device, a spectrum map message which indicates at least some of the channels which are available for use, and transmitting, by the pilot radio device, the spectrum map message.

According to another exemplary embodiment a communication system, a pilot radio device which generates and transmits radio environment information to enable non-cognitive radio devices to operate as cognitive radios, the pilot radio device including: a broadband radio receiver configured to receive a broadband radio sample associated with a radio environment, a processor configured to analyze the broadband radio sample to identify channels in the radio environment which are available for use, and further configured to generate a spectrum map message which indicates at least some of the channels which are available for use, and a transmitter configured to transmit the spectrum map message.

According to yet another exemplary embodiment, a method for enabling a non-cognitive radio device to operate as a cognitive radio device includes the steps of: receiving, by the non-cognitive radio device, a spectrum map message which indicates channels which are locally available for use, selecting, by the non-cognitive radio device, a channel for use by the non-cognitive radio device, configuring, by the cognitive radio device, the cognitive radio device to transmit using the channel, and transmitting, by the non-cognitive radio device, the radio signal on the channel.

According to still another exemplary embodiment, a non-cognitive radio device includes a transceiver configured to transmit and receive radio signals, including reception of a broadcast channel which includes a spectrum map message that indicates channels which are currently locally available for usage by the non-cognitive radio device, and a processor configured to process the spectrum map message and to select at least one of the channels which are currently available for usage by the non-cognitive radio device and further configured to control the transceiver to transmit and receive the radio signals on the selected at least one channel.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Another challenge which may be encountered in the development of cognitive radio is the capability of devices to perform the spectrum analysis needed to enable cognitive radio functionality. For example, while some M2M modules will be embedded in devices with significant computational capabilities, many other M2M modules are likely to be integrated in devices, particularly inexpensive devices, that do not have as much onboard computational (and, by extension, spectrum analysis) capability. Accordingly, exemplary embodiments described herein provide a mechanism that allows devices that are less capable (from a computational perspective) to function effectively in a radio environment where radio cognition is desirable.

Figure 1:
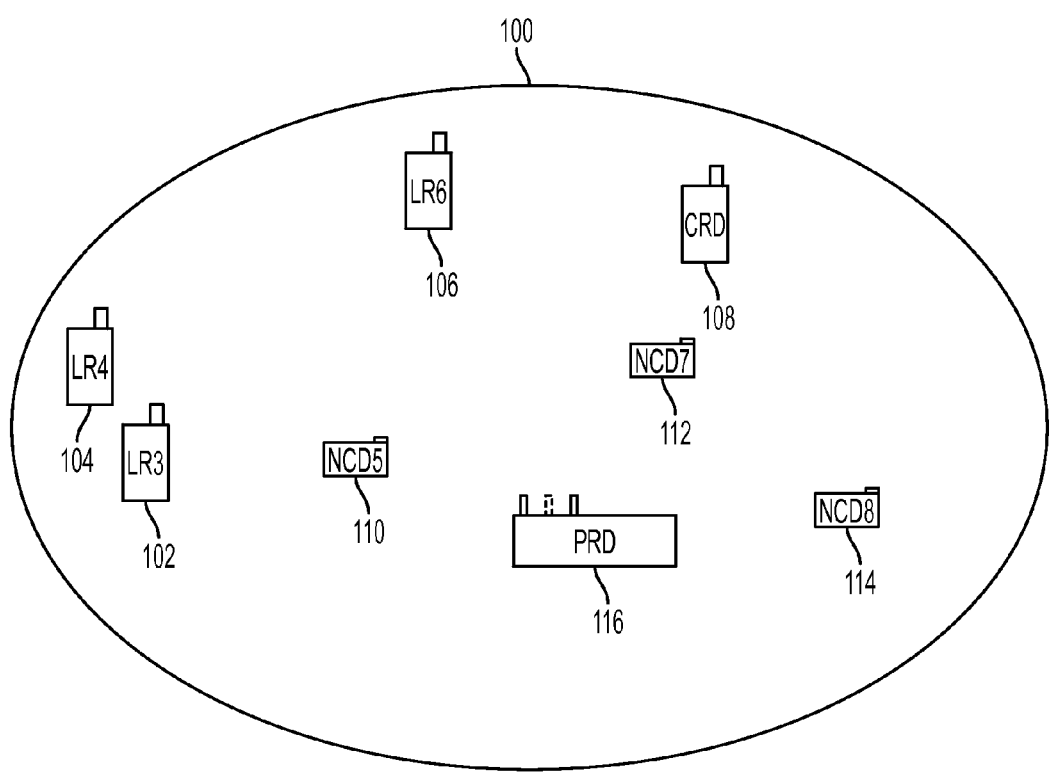
FIG. 1 illustrates a communication system according to an exemplary embodiment.

In order to provide some context for this discussion, FIG. 1 illustrates an exemplary radio environment 100 in which a number of wireless devices are operating at a particular time. For example, the radio environment 100 includes a number of licensed radios 102, 104, and 106 operating in the same general geographic area and which can each be considered a primary user of some piece of the spectrum. For example, radio 102 could be a CDMA mobile telephone, radio 104 could be an 802.11 access point and radio 106 could be a ham radio. These licensed radios 102, 104 and 106 are referred to herein as being associated with "primary users" since they are operating within a single, specific portion of the frequency spectrum (or a few such frequency bands, e.g., multi-band cellular phones) which has been allocated for their specific use type and for which they have been specifically designed to transmit and receive wireless radio signals. Thus, each of the licensed radios 102, 104 and 106 are transmitting and receiving on some unspecified (and possibly disparate) set of frequencies in the radio environment 100. The licensed radio devices 102, 104 and 106 are also non-cognitive in the sense that they do not typically possess the capability to evaluate a broad frequency spectrum to determine, for example, interference levels on different frequencies and then select for themselves one or more frequencies to use for their own transmissions (albeit some of these devices will typically have the capability to perform signal strength measurements and report such measurements to their respective radio networks and/or may permit a user to select a frequency for transmission). Instead, the licensed radios 102, 104 and 106 are typically either assigned a radio resource by their respective network for use in transmitting and receiving radio signals or have a default radio resource which requires no assignment.

The radio environment 100 also includes one exemplary cognitive radio device (CRD) 108 and three exemplary non-cognitive radio devices (NCDs) 110, 112 and 114. Those skilled in the art will appreciate that the number of these devices present in the radio environment 100 is purely illustrative and that more or fewer could be present. The cognitive radio device 108 has the capability itself to evaluate the radio environment in its proximity (which may be the same as, or similar to radio environment 100) and to select one or more frequencies to use for its own transmission. By way of contrast, the NCDs 110, 112 and 114 are devices that need to be able to transmit and receive on frequencies that are available within the radio environment 100, but which are not primary users of the spectrum (as are licensed radio devices 102, 104 and 106), are not assigned or allocated radio frequencies by a communication network, and do not possess the independent capability themselves, e.g., in terms of hardware and/or processing power, to evaluate one or more frequency bands and select one or more frequencies for their own and can only use the frequencies on a non-interfering basis (as does CRD 108).

Figure 2:
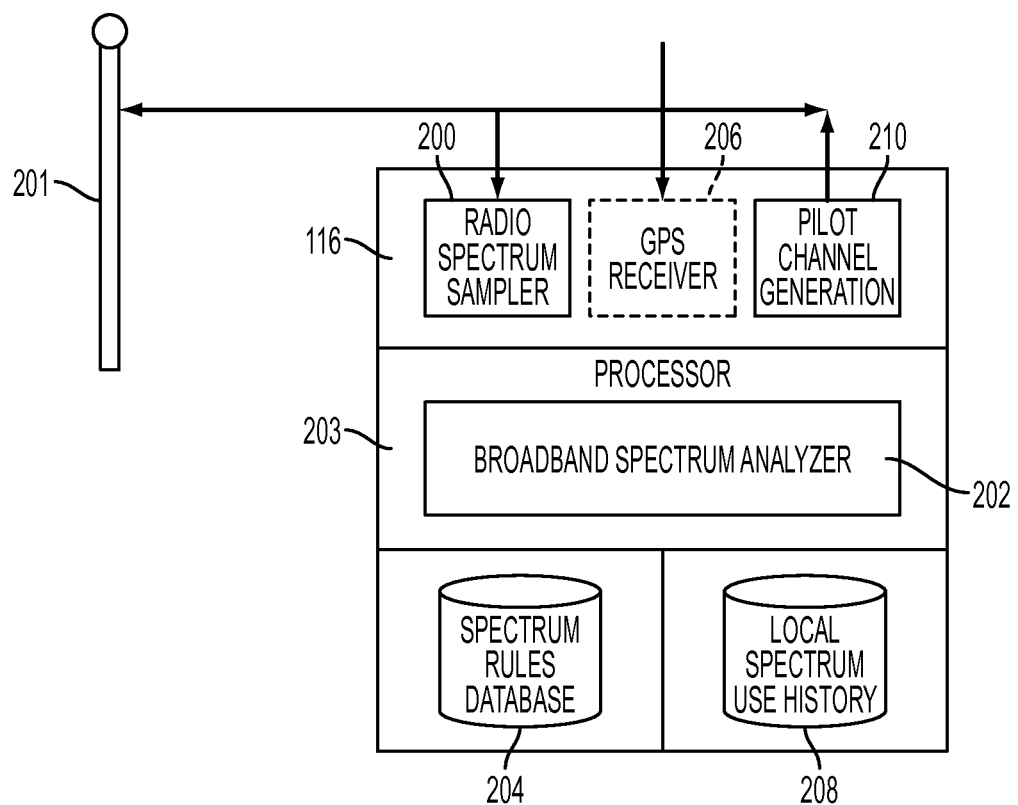
FIG. 2 illustrates an exemplary pilot radio device according to an exemplary embodiment.

According to exemplary embodiments, it is desirable to enable the non-cognitive radio devices 110, 112 and 114 to operate as if they were cognitive radio devices despite their lack of a spectrum evaluation capability. This is accomplished by, among other things, provision of a pilot radio device (PRD) 116 in the radio environment 100. The PRD 116 broadcasts information to the NCDs 110, 112 and 114 which enables these devices to operate as if they were cognitive radio devices, as will be described below in more detail with respect to FIG. 2.

Therein, an exemplary PRD 116 is illustrated and includes a radio spectrum sampler 200, which can be implemented as a broadband radio receiver that is capable of sampling the radio spectrum across the frequency range of interest, for instance from 900 Mhz to 3 Ghz via one or more antennas 201. Once the spectrum is sampled by the PRD 116, it is analyzed. This task can be performed by a broadband spectrum analyzer (BSA) 202, which can be implemented as a software application running on a processor 203. According to one exemplary embodiment, the BSA 20 can analyze the signal to detect whether (or where, in terms of frequency and/or time) there are signals that can be separated from noise. The BSA 202 can take into account changes in the noise environment that can occur and set a ceiling on the amount of noise that can exist in the radio environment 100 before it becomes impossible to distinguish legitimate signals. When that ceiling is exceeded, that portion of the spectrum is considered to be unusable from the perspective of radio cognition.

The PRD 116 can also be configured to address radio shadowing. For example, since the PRD 116 is intended to monitor the radio environment 100 on behalf of the non-cognitive devices 110, 112 and 114, then the PRD 116 can include a high gain antenna 201 which may be remote from the main (processing) unit which includes the other elements shown in FIG. 2. The high gain antenna 201 can thus be placed in a geographically advantageous position such that it is capable of receiving signals from anywhere within the radio environment 100 which PRD 116 supervises.

A spectrum rules database 204 can also be provided to PRD 116. According to one exemplary embodiment, the spectrum rules database can be a preconfigured list which identifies those frequencies that are candidates for use in a cognitive radio scheme. The spectrum rules database 204 can be pre-loaded based on the planned location of the PRD 116 prior to its installation in the radio environment 100. Alternatively, the spectrum rules database 204 can be populated dynamically based on information transmitted to the PRD 116.

The addition of an optional GPS receiver 206 to PRD 116 provides additional capabilities including, for example, the use of a spectrum rules database 204 that contains multiple frequency maps, the correct one of which is then selected automatically upon installation of the PRD 116 based on the PRD's GPS-determined position. An additional enhancement enabled by adding GPS capabilities is that the PRD 116's position can be broadcast along with frequency information described below. This feature would enable NCDs that are within radio reception range of more than one PRD 116 to make decisions based on the relative positions of the information sources.

The PRD 116 can also maintain a record of the use of the local spectrum, shown as database 208, by storing the information which it processes from broadband spectrum analyzer 202. This information can be used to augment the spectrum analysis in that it allows the PRD 116 to know, for example, whether a particular piece of frequency has recently been used, and how long that frequency band has been available. Such a mechanism can be used, for example, to enable the PRD 116 to handle the case where one of the NCDs 110, 112 or 114 stops transmitting for a period of time but still needs access to the spectrum, e.g., when the device 110, 112 or 114 stops transmitting in order to listen to the status on the pilot channel, which channel is described below.

Figure 3:
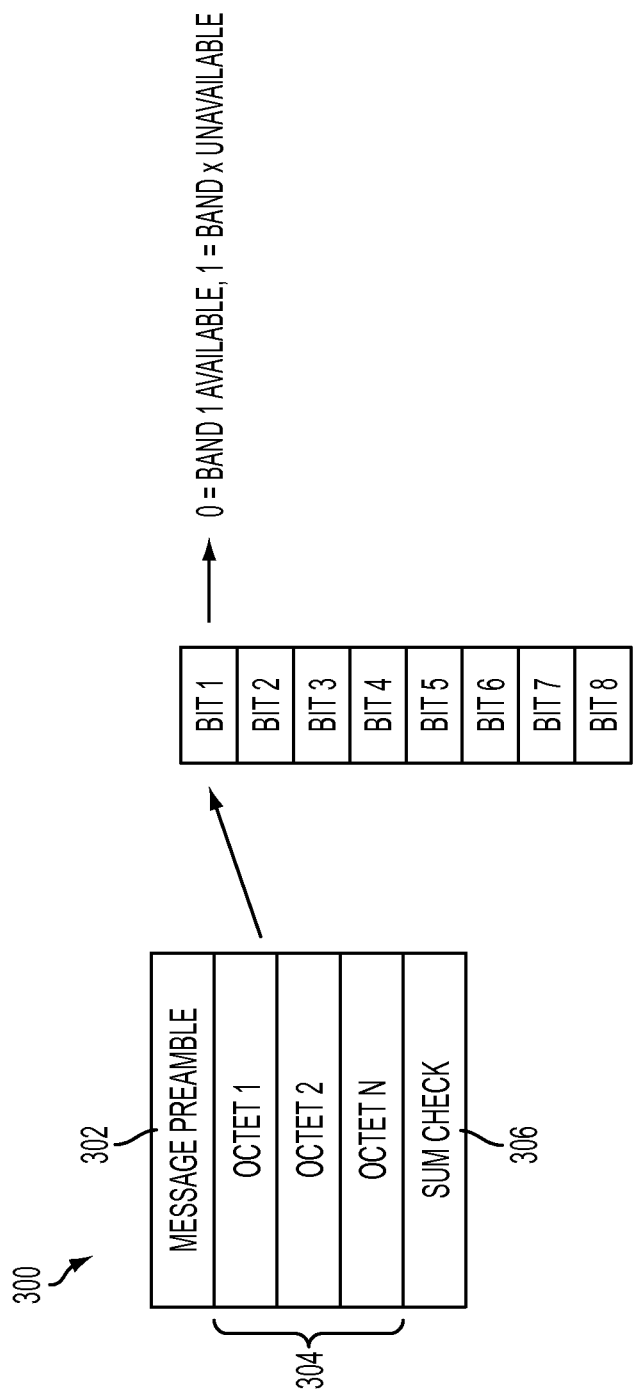
FIG. 3 illustrates an exemplary spectrum map message according to an exemplary embodiment.

The output of the spectrum analysis performed by the PRD 116 can include a spectrum map message that is transmitted on a meta-pilot channel, so referred to herein as the meta-pilot channel describes the current usage of a number of other radio channels. The spectrum map message can be generated by pilot channel generator 210 and transmitted by PRD 116 via antenna 201. According to one exemplary embodiment, the spectrum map message can include the information illustrated in FIG. 3, which spectrum map message can be transmitted periodically by PRD 116. Therein, spectrum map message 300 includes a preamble 302, i.e., a bit pattern that delimits the beginning of the message 300, a bit mask 304, and a sum check (checksum) 306. The bit mask 304 includes information regarding which frequency bands in the range of interest are available and which frequency bands are not, i.e., at the time that the last spectrum analysis was performed by the PRD 116. Frequency band numbering can follow standards relevant for the country where the PRD 116 is employed.

The sum check 306 provides confidence that the entire message has been received and decoded correctly by an NCD 110, 112 or 114 (this function could also be performed on a lower layer). It will be appreciated by those skilled in the art that the spectrum map message 300 illustrated in FIG. 3 and described above is illustrative, and that numerous variations are possible. For example, there are numerous methods for delimiting the spectrum map message length, i.e. by using a fixed and known frame length such that the receiver of the message can verify the frame start and end by looking for the message preamble and the checksum.

Figure 4A:
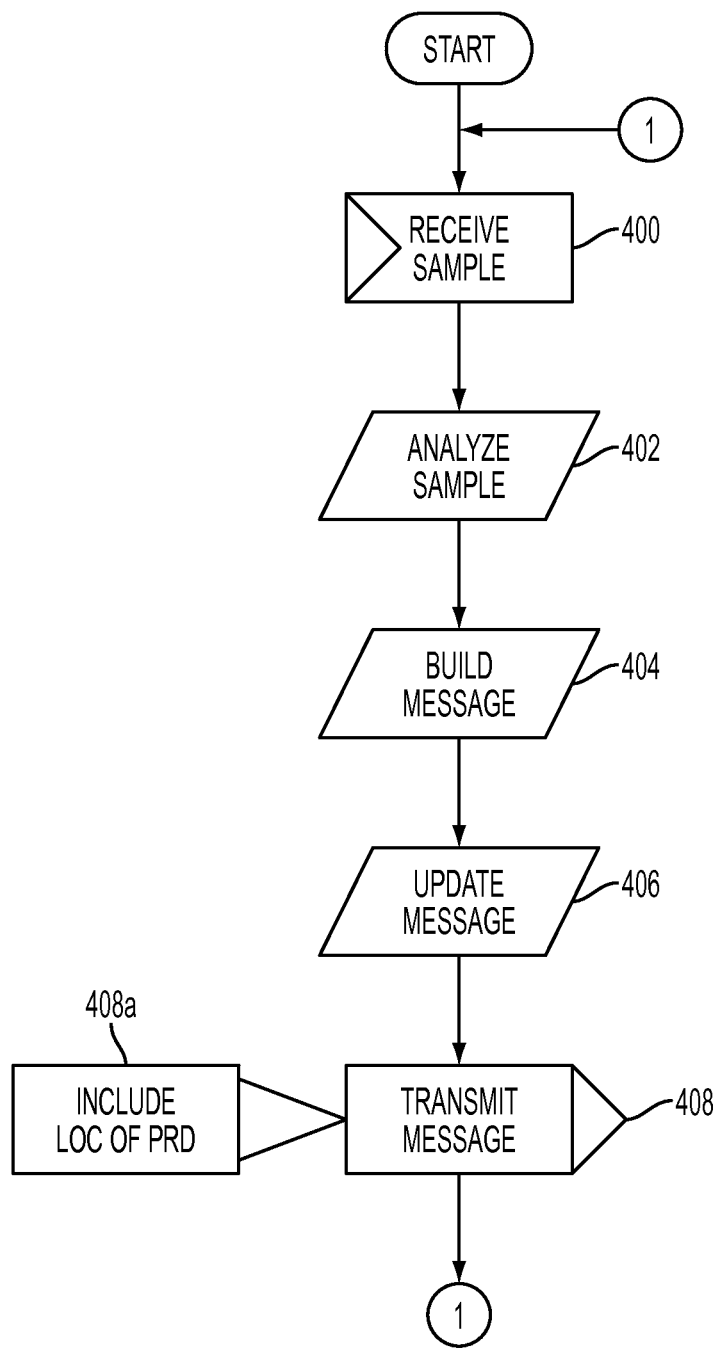
FIGS. 4(a)-4(c) are flow charts depicting methods for generating and transmitting radio environment information according to exemplary embodiments.
Figure 4B:
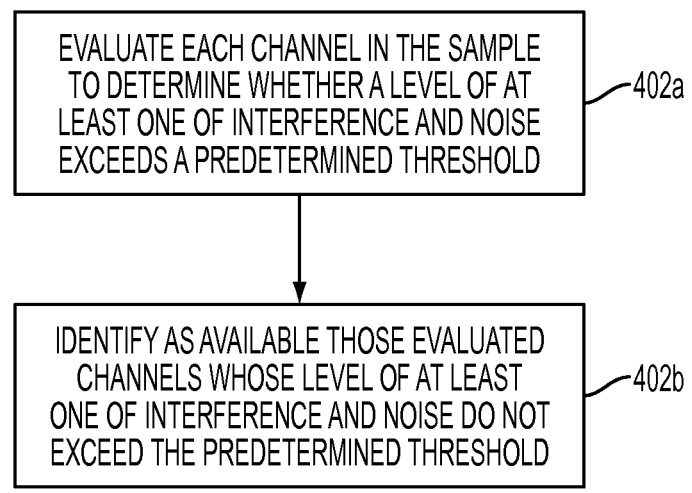
Figure 4C:
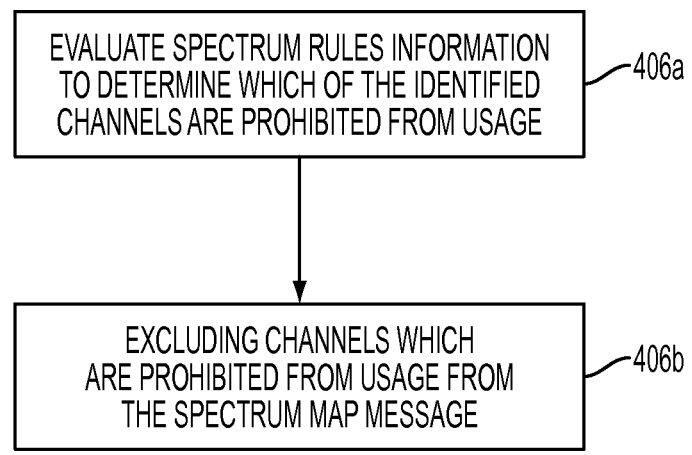

PRD 116 can operate as, for example, illustrated in the flow diagram of FIG. 4(*a*). Therein, at step 400, a broadband radio sample is taken. In step 402, the sample is analyzed by the PRD 116 to determine, for example, whether there are active users in particular frequencies. This analysis can, for example, include a number of different approaches e.g., processing the sample to separate signals from noise or phase-locked loop circuits. Moreover, given that the primary usage of most of the frequency bands are known a priori, such knowledge of the primary usage of the frequency bands gives the PRD 116 the knowledge to identify candidate modulation techniques in those bands. This knowledge, in turn, can be used to complement the signal detection process as well as to provide information regarding how users on the same or adjacent channels might interact. As one example, the analysis indicated by step 402 can determine whether each frequency in the range of interest has a predetermined interference level that is below a predetermined threshold and, if so, can add that frequency to the list of available frequencies to be transmitted on the spectrum map message 300, as shown in FIG. 4(*b*) steps 402*a* and 402*b*.

In step 404, the spectrum map message containing the list of available frequencies is populated. Generation of the spectrum map message can also include an updating of the spectrum map message in step 406. This updating process can, for example, include consulting of the database of allowed frequencies within the local radio environment, which information is stored in spectrum rules database 204 to remove those frequencies from the spectrum map message that are not permitted to be used in the geographical location in which PRD 116 is deployed, as illustrated in steps 406*a* and 406*b* in FIG. 4(*c*). In step 408, the spectrum map message 300 is transmitted over the broadcast channel, which may optionally include a location the location of PRD 116 as indicated by block 408*a*. In this context, the broadcast channel may include one broadcast channel or a plurality of broadcast channels if the NCDs 110, 112 and 114 are anticipated to have transceivers with, for example, non-overlapping frequency bands of reception.

Figure 5:
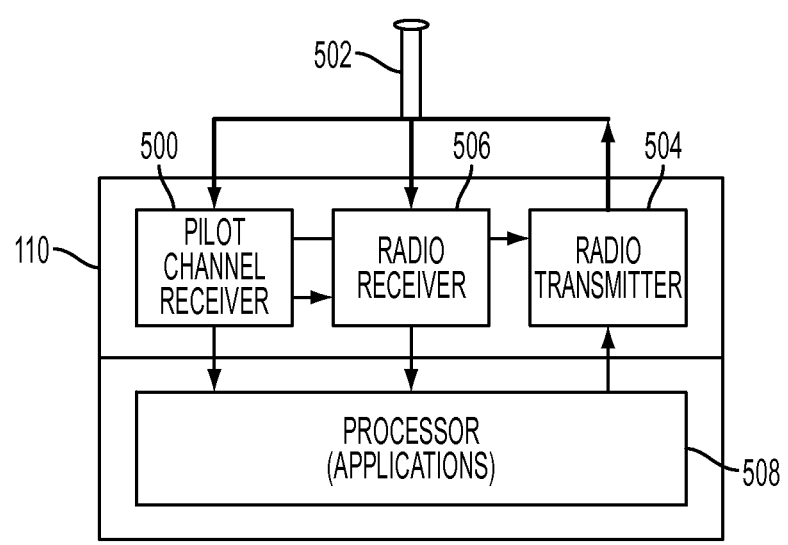
FIG. 5 shows an exemplary non-cognitive radio device according to an exemplary embodiment.

Having described exemplary embodiments associated with the PRD 116, some more details regarding the recipients of the spectrum map message 300 transmitted over a wireless broadcast channel will now be provided. An exemplary NCD 110 is illustrated in FIG. 5. According to some exemplary embodiments, it is anticipated that NCD 110 may be a small form-factor, embedded receiver with relatively limited computational processing power. In the exemplary embodiment illustrated in FIG. 5, a pilot channel receiver 500 receives the pilot channel (e.g., broadcast) radio information including, for example, the spectrum map message 300 which has been transmitted by PRD 116 as described above. The antenna 502 also supports normal transmit and receive radio functions of the device 110 via the radio transmitter 504 and radio receiver 506.

The pilot channel receiver 500 receives the pilot channel information, e.g., a spectrum map message 300, and uses this information to select a radio channel for the transmit and receive operations of the NCD 110 from among those which are indicated as currently available, as described below. The relevant receive and transmit parameters for the NCD's radio can then be set in the radio receiver 506 and radio transmitter 504, e.g., either directly or via a processor 508 on which one or more software applications are running According to some exemplary embodiments, it may also be the case that the characteristics of the selected radio channel affect the application to be supported, for instance to set transmit rates, select codec type, change frame structures, etc. In this case, the characteristics of the radio channel can also be communicated to the relevant applications running on processor 508.

Figure 6A:
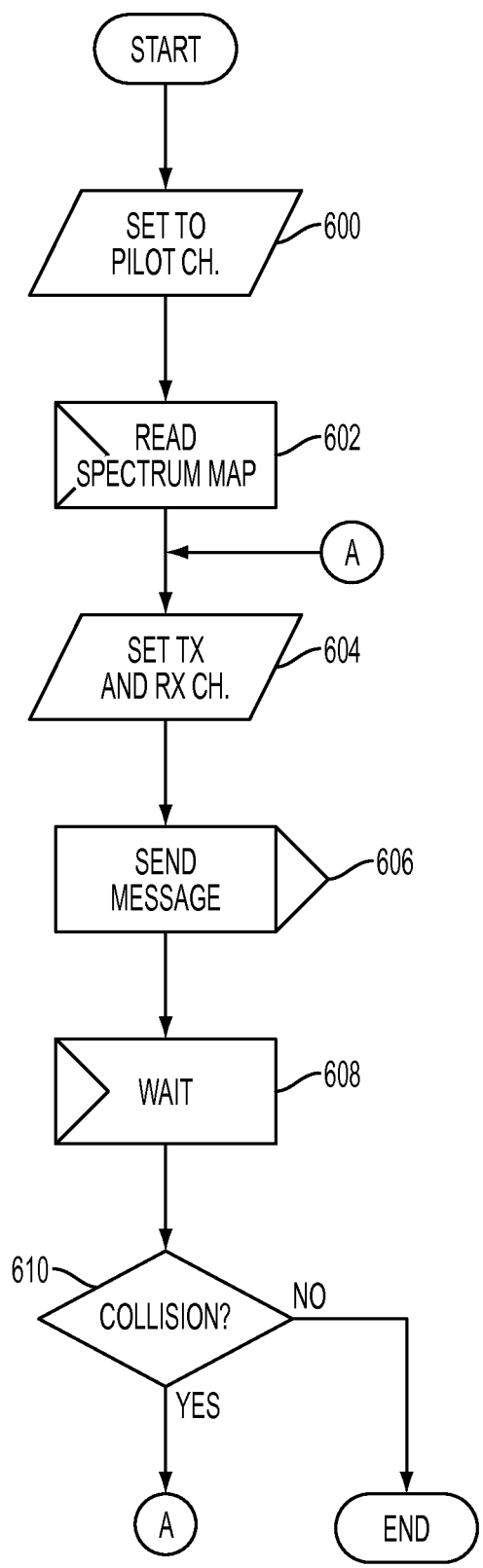
FIGS. 6(a) and 6(b) are flow charts depicting methods for enabling a non-cognitive radio device to operate as a cognitive radio device according to exemplary embodiments.
Figure 6B:
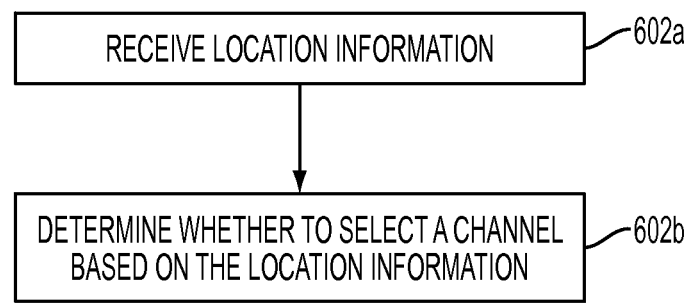

Using the exemplary structure discussed above with respect to FIG. 5, an NCD 110 can operate as if it were a cognitive radio device as, for example, illustrated in the flow diagram of FIG. 6. Therein, at step 600, the non-cognitive radio device 110 sets its receive channel, e.g., frequency, to the channel where the pilot broadcast signal is expected to be found. As will be appreciated by those skilled in the art, the term "channel" as used herein is intended to be generic to any type of radio resource which a radio can use to transmit or receive information including, but not limited to, channels having different time, frequency, code, or other characteristic and which are defined by the relative air interface type(s) which are being employed, e.g., TDMA, CDMA, OFDM, etc. The NCD 110 may have stored therein a single channel identification on which pilot information is to be received or there could be a list of candidate channels, in which case the NCD 110 can check the listed channels until the pilot channel is found.

In step 602, the spectrum map message, e.g., spectrum map message 300 described above, received and processed by the NCD 110. Based on the contents of the received spectrum map message 300, the device 110 can select a channel for its usage. If location information about the PRD 116's location is provided as part of the spectrum map message, then this information may be used to select a channel as well, as indicated by steps 602a and 602b in FIG. 6(b). The non-cognitive device 110 will then set, for example, its send and receive frequencies (or other channel parameters) based on the selected channel, as shown in step 604. Any desired methodology can be used by the device 110 to select an available channel from among those indicated in the spectrum map message 300. For example, spectrum map message 300 may identify available channels within a large frequency range which exceeds the operable frequency range of the transmitter 504 and receiver 506. In such a case, the processor 508 can select, for example, the first listed channel within the spectrum map message 300 which is within the operable frequency range of the NCD 110. Alternatively, e.g., if it is envisioned that a large number of NCD's 110 having the same or similar operable frequency ranges will be operating in the radio environment 100, then it may be desirable for each NCD 110 to randomly or pseudo-randomly select a channel from the subset of the list within the operable frequency range to reduce potential collisions, as will now be described in more detail below.

Steps 606-610 in FIG. 6 depict a backoff sequence that can be used according to some exemplary embodiments to address the potential for collision between two NCD devices that happen to select the same channel on which to begin transmitting at the same or substantially the same time. Thus, at step 606, the NCD 110 transmits a message, i.e., toward another radio device in radio environment 100, on its first selected channel from the spectrum message map 300. The NCD 608 then waits at 608 for a predetermined time to, for example, receive an acknowledgment to the sent message. If an acknowledgement is received at step 610, then the NCD 110 can presume there was no collision and can continue to transmit and receive using the selected channel(s), thus following the "No" branch of the flow diagram of FIG. 6. Alternatively, if no acknowledgement is received, then the NCD 110 can presume that a collision occurred and can re-transmit the initial message by following the "Yes" branch from block 610. Retransmission can, for example, be performed in different ways. For example, according to one exemplary embodiment, the NCD 110 can refer to the previously received spectrum map message 300 to select a second channel (or set of channels) that is indicated as available and is within NCD 110's operable range, which second channel (or set of channels) is different from the first channel (or set of channels). An alternative back-off scheme could, for example, have the NCD 110 wait until the next broadcast frame is received before making a retransmission attempt. If the first selected channel is then indicated to be occupied or unavailable, then the next available channel can be selected from the spectrum map message 300 and the process repeated.

The foregoing exemplary embodiments provide systems, devices and techniques which enable devices which would otherwise be unable to independently assess the radio environment in order to make a decision regarding which radio resources they can use, to be able to do so based on information received via a pilot or broadcast channel. Coordination between such cognitive dependent radios is performed more-or-less automatically since, as the devices become active, their activity will appear in the radio spectrum samples taken by the PRD 116 and will thus be reflected in the spectrum map message 300. As will be appreciated by those skilled in the art, in situations where the use of the radio spectrum can vary over time (or where the radio environment can significantly vary, e.g., due to widely varying noise levels), the processes described above can be performed at pre-configured intervals by having the non-cognitive devices monitoring the pilot channel periodically for updates. Under such exemplary embodiments, as the NCDs are not typically primary users of the spectrum, the received spectrum map messages may operate as handover commands, i.e., forcing NCDs to stop using channels whose interference and or noise levels have risen beyond a threshold.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for enabling a non-cognitive radio device to operate as a cognitive radio device in a communication network, the method comprising the steps of:

receiving, by said non-cognitive radio device, a spectrum map message which indicates channels which are locally available for use;

selecting, by said non-cognitive radio device, a channel for use from the spectrum map message;

configuring, by said non-cognitive radio device, to transmit using said selected channel;

transmitting, by said non-cognitive radio device, a message on said selected channel toward another radio device;

waiting, by said non-cognitive radio device, for a predetermined time to receive an acknowledgment to the sent message;

if the acknowledgment is received then continuing, by said non-cognitive radio device, to transmit and receive messages using said selected channel;

if the acknowledgment is not received then retransmitting, by said non-cognitive radio device, the message using another channel selected from the spectrum map message to prevent a collision with another non-cognitive radio device that selects the same channel on which to begin transmitting at the same or substantially the same time, wherein the transmitting step, the waiting step, the continuing step, and the retransmitting step are performed even though the received spectrum map message indicated that the selected channel was locally available for use; and, wherein the non-cognitive radio device transmits and receives on frequencies that are available within a radio environment but the non-cognitive radio device is not a primary user of a spectrum and is not assigned or allocated radio frequencies by the communication network, wherein the non-cognitive radio device does not possess an independent capability to evaluate one or more frequency bands and then select one or more frequencies, and wherein the non-cognitive radio device only uses the radio frequencies on a non-interfering basis.

2. The method of claim 1, wherein said channels which are locally available for use are those channels which have at least one of interference and noise which are below a predetermined threshold.

3. The method of claim 1, further comprising the steps of:
receiving, by said non-cognitive radio device, location information associated with a device which transmitted said spectrum map message; and
determining, by said non-cognitive radio device, whether to select said channel from said spectrum map message based on said location information.

4. The method of claim 1, wherein said spectrum map message includes channels which are capable of being used by said radio device and channels which are not capable of being used by said radio device, and wherein said selecting further comprises the step of:
selecting, by said non-cognitive radio device from said spectrum map message, a channel which said radio device is capable using.

5. The method of claim 4, further comprising the step of:
randomly or pseudo-randomly selecting, by said non-cognitive radio device, said channel from among those channels in said spectrum map message which are within said capability of said radio device.

6. A non-cognitive radio device for use in a communication network, the non-cognitive radio device comprising:
a transceiver configured to transmit and receive radio signals, including reception of a broadcast channel which includes a spectrum map message that indicates channels which are currently locally available for usage by said non-cognitive radio device; and
a processor configured to process said spectrum map message and to select therefrom at least one of said channels which are currently available for usage by said non-cognitive radio device and further configured to control said transceiver to transmit a message on said selected at least one channel toward another radio device and wait for a predetermined time to receive an acknowledgment to the sent message, where if the acknowledgment is received then continue to transmit and receive messages using said selected at least one channel, where if the acknowledgment is not received then retransmit the message using another at least one channel selected from the spectrum map message to prevent a collision with another non-cognitive radio device that selects the same channel on which to begin transmitting at the same or substantially the same time, wherein the transmit operation, the wait operation, the continue operation, and the retransmit operation are performed even though the received spectrum map message indicated that the selected channel was locally available for usage by said non-cognitive radio device;

wherein the transceiver and the processor are components of the non-cognitive radio device; and, wherein the non-cognitive radio device transmits and receives on frequencies that are available within a radio environment but the non-cognitive radio device is not a primary user of a spectrum and is not assigned or allocated radio frequencies by the communication network, wherein the non-cognitive radio device does not possess an independent capability to evaluate one or more frequency bands and then select one or more frequencies, and wherein the non-cognitive radio device only uses the radio frequencies on a non-interfering basis.

7. The non-cognitive device of claim 6, wherein said channels which are currently locally available for use are those channels which have at least one of interference and noise which are below a predetermined threshold.

8. The non-cognitive device of claim 6, wherein said transceiver is further configured to receive location information associated with a device which transmitted said spectrum map message; and wherein said processor is further configured to determine whether to select said channel from said spectrum map message based on said location information.

9. The non-cognitive device of claim 6, wherein said spectrum map message includes channels which are capable of being used by said non-cognitive radio device and channels which are not capable of being used by said device, and wherein said processor is configured to select, from said spectrum map message, a channel which said device is capable of using.

10. The non-cognitive device of claim 9, wherein said processor is further configured to randomly or pseudo-randomly select said channel from among those channels in said spectrum map message which are within said capability of said non-cognitive radio device.

11. A method for enabling a non-cognitive radio device to operate as a cognitive radio device in a communication network, the method comprising the steps of:
receiving, by the non-cognitive radio device, a first spectrum map message that indicates channels which are currently locally available for usage by said non-cognitive radio device;
receiving, by the non-cognitive radio device, a second spectrum map message that indicates channels which are currently locally available for usage by said non-cognitive radio device;
receiving, by the non-cognitive radio device, a location of a first device which transmitted said first spectrum map message, and a location of a second device which transmitted said second spectrum map message;

selecting, by the non-cognitive radio device, either the first spectrum map message or the second spectrum map message based on the location of the first device and the location of the second device;
processing, by the non-cognitive radio device, the selected first or second spectrum map message to select at least one of said channels which are currently available for use by said non-cognitive radio device;
transmitting and receiving, by the non-cognitive radio device, radio signals on said selected at least one channel and if needed transmitting and receiving radio signals on another selected at least one channel to prevent a collision with another non-cognitive radio device that selects the same channel on which to begin transmitting at the same or substantially the same time; and,
wherein the non-cognitive radio device transmits and receives on frequencies that are available within a radio environment but the non-cognitive radio device is not a primary user of a spectrum and is not assigned or allocated radio frequencies by the communication network, wherein the non-cognitive radio device does not possess an independent capability to evaluate one or more frequency bands and then select one or more frequencies, and wherein the non-cognitive radio device only uses the radio frequencies on a non-interfering basis.

12. A non-cognitive radio device for use in a communication network, the non-cognitive radio device comprising:
a transceiver configured to transmit and receive radio signals, including reception of a broadcast channel which includes a first spectrum map message that indicates channels which are currently locally available for usage by said non-cognitive radio device, and a second spectrum map message that indicates channels which are currently locally available for usage by said non-cognitive radio device;
the transceiver further configured to receive a location of a first device which transmitted said first spectrum map message, and configured to receive a location of a second device which transmitted said second spectrum map message;
a processor configured based on the location of the first device and the location of the second device to select either the first spectrum map message or the second spectrum map message;
the processor configured to process said selected first or second spectrum map message to select at least one of said channels which are currently available for use by said non-cognitive radio device and further configured to control said transceiver to transmit and receive said radio signals on said selected at least one channel and if needed to transmit and receive radio signals on another selected at least one channel to prevent a collision with another non-cognitive radio device that selects the same channel on which to begin transmitting at the same or substantially the same time; and,
wherein the non-cognitive radio device transmits and receives on frequencies that are available within a radio environment but the non-cognitive radio device is not a primary user of a spectrum and is not assigned or allocated radio frequencies by the communication network, wherein the non-cognitive radio device does not possess an independent capability to evaluate one or more frequency bands and then select one or more frequencies, and wherein the non-cognitive radio device only uses the radio frequencies on a non-interfering basis.

13. A non-cognitive radio device for use in a communication network, the non-cognitive radio device comprising:
a transceiver configured to transmit and receive radio signals, including reception of a broadcast channel which includes a spectrum map message that indicates channels which are currently locally available for usage by said non-cognitive radio device; and
a processor configured to process said spectrum map message and to select therefrom at least one of said channels which are currently available for usage by said non-cognitive radio device and further configured to control said transceiver to transmit a message on said selected at least one channel toward another radio device and wait for a predetermined time to receive an acknowledgment to the sent message, where if the acknowledgment is received then continue to transmit and receive messages using said selected at least one channel,
where if the acknowledgment is not received then wait until a next spectrum map message is received before making a retransmission attempt to prevent a collision with another non-cognitive radio device that selects the same channel on which to begin transmitting at the same or substantially the same time, wherein the transmit operation, the first wait operation, the continue operation, and the second wait operation are performed even though the received spectrum map message indicated that the selected channel was locally available for usage by said non-cognitive radio device; and
wherein the transceiver and the processor are components of the non-cognitive radio device.

14. The non-cognitive device of claim 13, wherein the non-cognitive radio device needs to transmit and receive on frequencies that are available within a radio environment but the non-cognitive radio device is not a primary user of a spectrum and is not assigned or allocated radio frequencies by a communication network, further the non-cognitive radio device does not possess an independent capability to evaluate one or more frequency bands and then select one or more frequencies for their own, and the non-cognitive radio device can only use the radio frequencies on a non-interfering basis.

15. A method for enabling a non-cognitive radio device to operate as a cognitive radio device in a communication network, the method comprising the steps of:
receiving, by said non-cognitive radio device, a spectrum map message which indicates channels which are locally available for use;
selecting, by said non-cognitive radio device, a channel for use from the spectrum map message;
configuring, by said non-cognitive radio device, said non-cognitive radio device to transmit using said selected channel;
transmitting, by said non-cognitive radio device, a message on said selected channel toward another radio device;
waiting, by said non-cognitive radio device, for a predetermined time to receive an acknowledgment to the sent message;
if the acknowledgment is received then continuing, by said non-cognitive radio device, to transmit and receive messages using said selected channel; and
if the acknowledgment is not received then waiting, by said non-cognitive radio device, until a next spectrum map message is received before making a retransmission attempt to prevent a collision with another non-cognitive radio device that selects the same channel on which to begin transmitting at the same or substantially the same time, wherein the transmitting step, the first waiting step, the continuing step, and the second waiting step are performed even though the received spectrum map message indicated that the selected channel was locally available for use.

16. The method of claim 15, wherein the non-cognitive radio device needs to transmit and receive on frequencies that are available within a radio environment but the non-cognitive radio device is not a primary user of a spectrum and is not assigned or allocated radio frequencies by a communication network, further the non-cognitive radio device does not possess an independent capability to evaluate one or more frequency bands and then select one or more frequencies for their own, and the non-cognitive radio device can only use the radio frequencies on a non-interfering basis.

* * * * *